United States Patent [19]

Zigler

[11] 4,370,139
[45] Jan. 25, 1983

[54] VARIABLE SPEED V-BELT SHEAVES

[75] Inventor: James D. Zigler, Columbus, Ind.

[73] Assignee: Reliance Electric Company, Columbus, Ind.

[21] Appl. No.: 84,729

[22] Filed: Oct. 15, 1979

[51] Int. Cl.³ .............................................. F16H 55/56
[52] U.S. Cl. ...................................... 474/45; 308/5 R
[58] Field of Search ............... 474/43, 44, 45; 308/78, 308/5 R

[56] References Cited

U.S. PATENT DOCUMENTS

| | | | |
|---|---|---|---|
| 1,634,768 | 7/1927 | Bonner | 308/5 R |
| 2,740,246 | 4/1956 | Smith et al. | 474/45 |
| 2,746,816 | 5/1956 | Michie et al. | 308/5 R |
| 3,252,346 | 5/1966 | Prior | 474/44 |
| 3,611,821 | 10/1971 | Legler | 474/45 |
| 3,785,458 | 1/1974 | Caldwell et al. | |
| 4,173,155 | 11/1979 | Togami et al. | 474/45 |

FOREIGN PATENT DOCUMENTS

| | | |
|---|---|---|
| 894027 | 10/1953 | Fed. Rep. of Germany . |
| 1199095 | 9/1968 | United Kingdom . |
| 1558203 | 1/1977 | United Kingdom . |

OTHER PUBLICATIONS

Reliance Electric Brochure, Bulletin No. G-2533-1.

VDI Zeitschrift (periodical) 106 (1964) No. 2, Sep. (III) p. 1360.
"Grundzüge der Schmiertechnik", by Erich Falz, Verlag Julius Springer, Berlin, 1931.

Primary Examiner—Kenneth Dorner
Attorney, Agent, or Firm—Marmaduke A. Hobbs

[57] ABSTRACT

A variable speed drive having a pair of sheaves and a belt interconnecting the sheaves in which one of the flanges on at least one of the sheaves is mounted on an axially moveable hub and is adjustable toward and away from the other flange. The hub is mounted on a shaft, and a key interconnects the shaft and hub and prevents relative rotation between the shaft and hub. The bearing surface of the hub is provided with spaced axially disposed lubrication grooves, and the shaft contains an axial passage and radial ports through which lubrication is injected into the grooves in the hub. An annular lubrication groove interconnects the axial lubrication grooves and is provided with a port for relief of excess lubricating pressure. The flange ends of the axial grooves are closed by a seal disposed in the end of the bore in the hub at the inner end thereof. The key is disposed in complementary key-ways in the shaft and hub, and the side of the hub adjacent the key is substantially uninterrupted and provides a smooth surface for contacting the key to facilitate sliding of the hub along the key and to prevent excessive wear between the hub and key.

9 Claims, 4 Drawing Figures

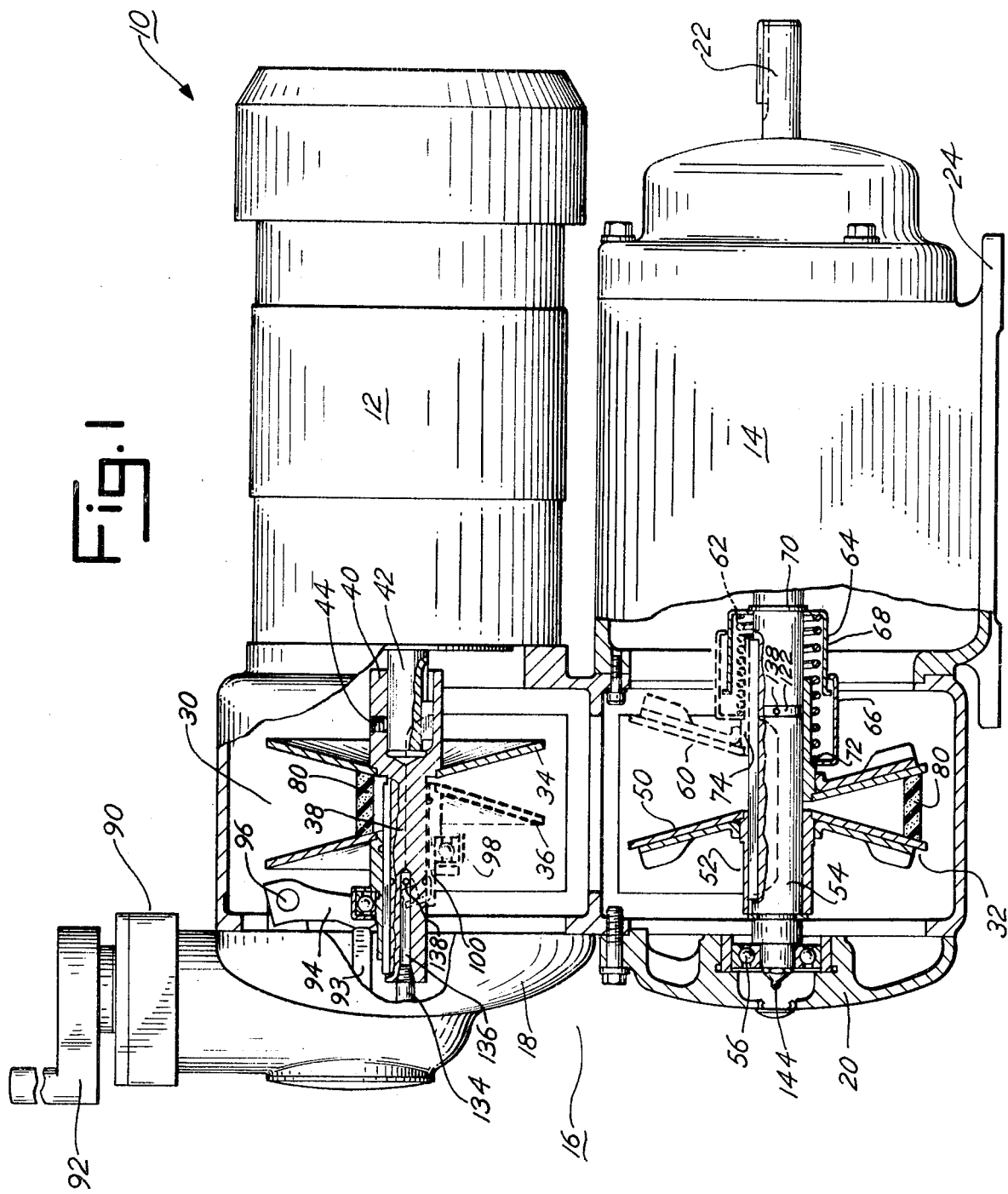

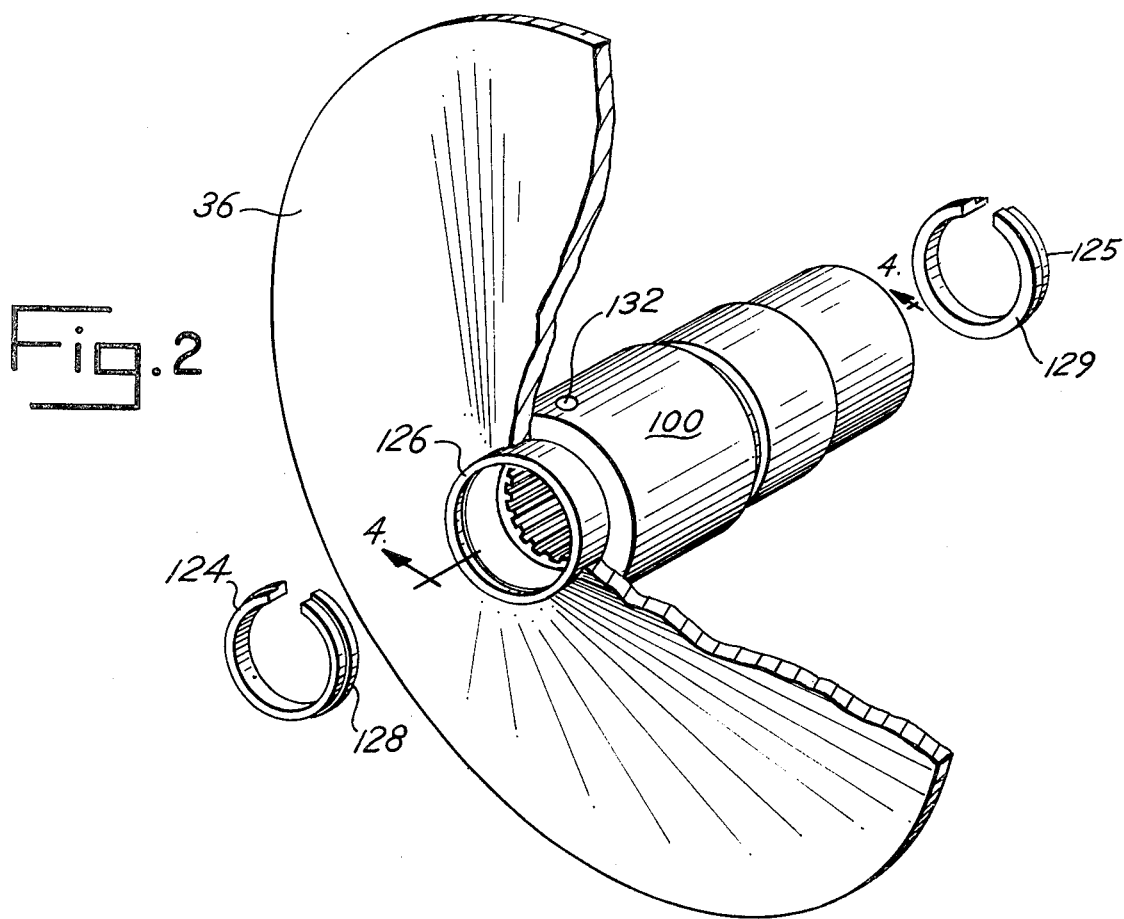
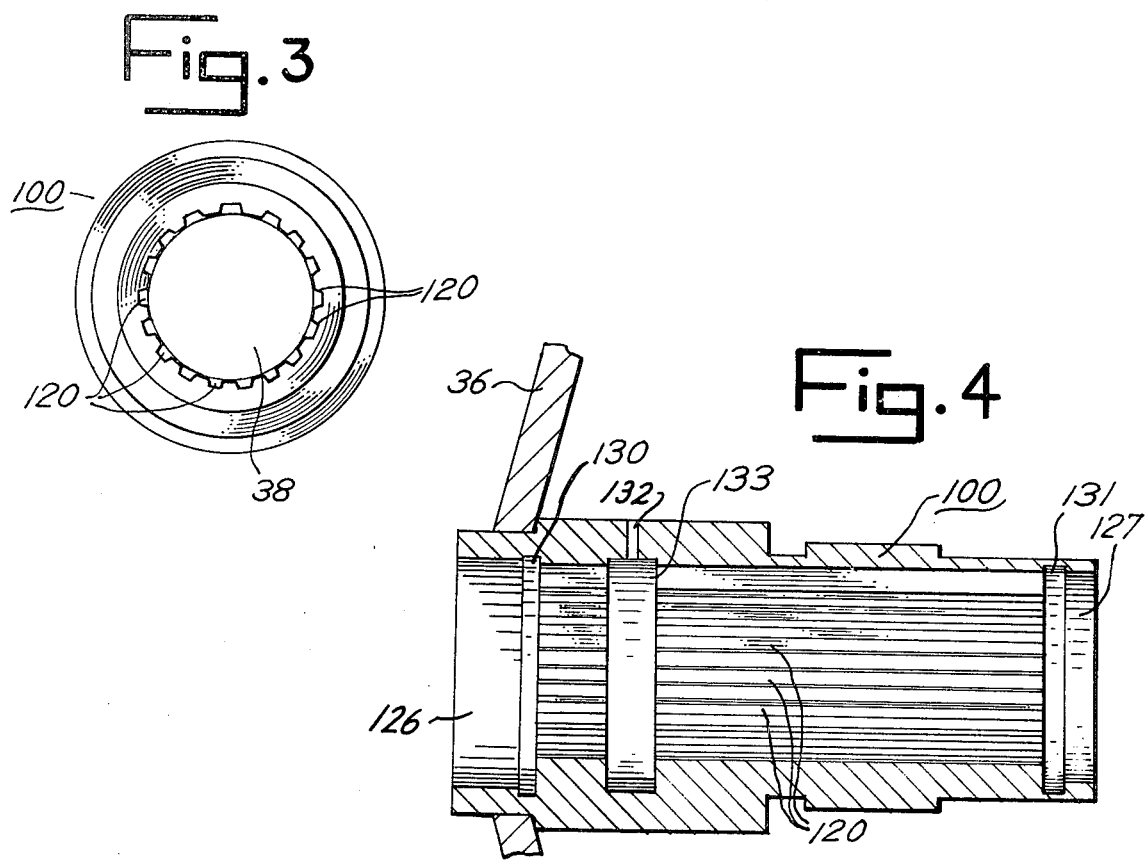

VARIABLE SPEED V-BELT SHEAVES

Variable V-belt sheaves are extensively used in the power transmission field, in combination with one another in which one of the variable sheaves is adjusted by an operator or in response to a control signal and the other sheave automatically adjusts itself to accommodate the adjustment made in the first sheave, or in combination with one another in which one of the sheaves is variable and the other is moved relative to the variable sheave to compensate for variations in the effective belt length when the adjustment in the speed is made. These variable speed drives often operate for extended periods of time under heavy loads, and are constantly subjected to excessive wear, particularly in the axially slidable sheave parts involved in the adjustment for different speeds. As a result of these prolonged adverse operating conditions, notching of the key and a substantial amount of fretting occurs in the parts subjected to the sliding contact, ultimately interfering with the proper operation and adjustment of the sheaves and necessitating the eventual replacement of the affected parts or of the complete sheave. The sliding parts of the sheave normally most affected by the fretting and wear under the aforementioned conditions consist of the shaft of the drive sheave and the hub slidable thereon, the hub usually being keyed to the shafts for rotation therewith and, when in proper operating condition, being freely moveable axially on the shaft. Further, the adverse operating conditions may cause roughness and binding between the key in the shaft and the contacting sliding portion of the hub, so that the sliding movement between the two parts is restrained to the extent that optimum operation of the variable pitch sheave is not possible even under normal operating conditions. It is therefore one of the primary objects of the present invention to provide a variable speed drive having adjustable pitch sheaves with an axially moveable hub, which can effectively and readily be adjusted to obtain a desired operating speed under adverse operating conditions, and which is so constructed and arranged that the sliding hub will continue to operate under the adverse conditions without the sliding surfaces becoming scored, corroded or otherwise damaged or subjected to excessive wear.

Another object of the invention is to provide a variable pitch sheave which will operate over extended periods of time without fretting occurring on the relatively slidable surfaces of the shaft and sliding hub involved in the adjustment of the pitch of the sheave, and which will maintain optimum operating performance over extended periods of adverse operating conditions.

A further object of the invention is to provide in a variable pitch sheave the combination of a shaft and an axially moveable hub mounted thereon in which effective lubrication is maintained between the shaft and the hub and between the key and the hub so that wear and fretting and the like between those parts in sliding contact are prevented or minimized, even under adverse operating conditions, thereby maintaining the sheave in optimum operating condition regardless of the loads encountered throughout the normal operating range of the drive.

Another object is to provide a variable pitch sheave of the aforementioned type which can be easily fabricated, assembled and installed, using standard equipment and tools, and which can thereafter be readily serviced and repaired in the field, using easily installed and assembled parts and subassemblies.

Still a further object of the invention is to provide a variable pitch sheave which is so constructed and designed that the parts thereof will withstand long continued operation with minimal servicing and without developing any adverse condition, such as vibration or hunting, which would interfere with the operation of the drive, thereby eliminating frequent replacement of parts or the complete unit.

The present invention involves the use, in a variable speed V-belt drive of a hub slidable axially on a shaft and having a series of axial grooves in the inner surface for lubricating the bearing surfaces of the hub and shaft. The hub is used with a key between the hub and shaft, and the sides of the hub along the key are smooth and mostly uninterrupted. The construction minimizes wear and prevents abrasion between the bearing surfaces by providing effective and reliable lubrication passages between the two relatively moving parts, as well as providing a good sliding surface between the sides of the key and the hub. An annular passage interconnecting the axial grooves is provided in the hub, preferably at one end thereof, to relieve excessive pressures in lubrication passages in the hub.

Objects and advantages of the present variable speed drive, in addition to those recited hereinbefore, will become apparent from the following description and accompanying drawings, wherein:

FIG. 1 is a partial elevational and cross sectional view of a variable speed V-belt drive embodying the present invention;

FIG. 2 is an exploded view of the axially movable belt flange and hub in the variable speed V-belt drive shown in FIG. 1;

FIG. 3 is an end elevational view of the hub shown in FIG. 2, on which the flange is mounted; and FIG. 4 is an enlarged fragmentary cross sectional view of the hub and a portion of the flange seen in FIG. 2.

Referring more specifically to the drawings, and to FIG. 1 in particular, numeral 10 indicates generally a variable speed V-belt drive having an electric motor 12 mounted on the housing of a gear reducer 14, and driving the gear reducer through the variable speed V-belt sheave unit indicated generally by numeral 16, the unit including upper and lower housings 18 and 20, respectively, connected together and forming a support for the motor 12. The motor is a conventional AC motor, which is fully enclosed and explosion and corrosion proof, and hence is capable of operating safely under a wide variety of industrial and commercial conditions. The gear reducer 14 may be of various types, and has an output shaft 22 which is connected directly by a coupling or through a belt or chain and sprocket drive to any one of a number of different types of driven equipment. The gear reducer housing has a base 24 for mounting on a suitable support structure (not shown) by bolts extending downwardly through the base into the support structure.

The present invention is primarily concerned with improvement in the variable speed V-belt sheaves, which in the embodiment illustrated, include a drive sheave 30 and a driven sheave 32, the drive sheave 30 consisting of an axially fixed flange 34 and an axially moveable flange 36 mounted on a shaft 38. The shaft is connected by a suitable coupling means 40 to the output shaft 42 of motor 12, and is secured thereto by a set screw 44. The sheave 32 consists of a fixed flange 50 having a hub 52 mounted on a shaft 54 which extends into the gear reducer and connects with the drive mechanism therein. The left hand end of the shaft is journaled in a bearing 56 disposed in housing 20, and the right hand end of the shaft is supported by one or more bearings in the gear reducer. An axially moveable flange 60 is disposed on shaft 54 and is urged toward the other flange by a spring 62 enclosed in housing 64 having telescopic sections 66 and 68, the right hand end of section 68 seating on a snap ring 70 in an annular groove in shaft 54, and the left hand end of section 66 abutting against a shoulder 72 on hub 74 supporting flange 60.

The two sheaves are drivingly connected to one another by a V-belt 80, and the pitch of the sheave is varied by a manual control mechanism, indicated generally by numeral 90, having a crank 92 for rotating a cam 93 for varying the position of a bifurcated lever 94 pivotally supported on pin 96. A bearing 98 is supported by the bifurcated lever, and is mounted on hub 100, which is moveable axially relative to shaft 38 as lever 94 is moved to the right or left, as seen in FIG. 1, by cam 93. Sheave 30, which is journaled in bearing 98, is supported on the left hand end by lever 94. As lever 94 is pivoted to the right, flange 36 moves toward flange 34, thus forcing the V-belt radially outwardly in the sheave. Simultaneously, the additional force applies a radially inward force on sheave 32, thus forcing flange 60 to the right and compressing spring 62. The foregoing movement of the two flanges 36 and 60 results in an increase in the relative speed of the two sheaves, and hence an increase in the speed of output shaft 22. Flange 36 is shown in two positions, the top portion showing the flange in the extreme minimizing speed position and the lower portion showing the flange 36 in the maximum speed position. The flanges of sheave 32 are likewise separated above and below shaft 54 to show the corresponding positions of that sheave in response to the shifting between the two positions of flange 36. The hub 100 is prevented from rotation relative to shaft 38 by a key disposed in key-ways in the hub and shaft, the key-way in the hub being indicated by numeral 112.

Since hubs 74 and 100 may be subject to substantial vibration, particularly under adverse operating conditions, without the present invention, fretting would be likely to occur on the bearing surfaces of the hub and shaft, resulting in freezing of the hub to the shaft, or at least interfering with the easy adjustment of the V-belt sheaves to obtain the speed desired. In the present invention, the bearing surface of hub 100 contains a plurality of axially disposed grooves 120 spaced around substantially the entire inner periphery of the hub, for distributing a lubricant effectively and uniformly between the bearing surfaces of the hub and shaft 38. These longitudinal grooves extend substantially the full length of the hub and are interconnected by an annular groove 122 in shaft 54, so that the lubricant is effectively distributed throughout the various grooves. The ends of the grooves are closed by lubricant seals 124 and 125, which seat in annular grooves 126 and 127 in the ends of the hub, the seals being of rubber or other resilient material and having annular ribs 128 and 129, respectively, for seating in annular grooves 130 and 131 and holding the seals in place in the bushing. Grooves 120 are also interconnected by annular groove 133 connected to a grease relief hole 132 extending radially outwardly through the bushing. The key-way in the shaft and bushing are preferably centered across the spacing for two axial grooves so that the sides of the hub along the key-way therein have substantially complete contact with the sides of the key within the hub, as seen in FIG. 3.

The grooves 120 receive the lubricant from the lubricating fixture, indicated generally by numeral 134, mounted on the end of shaft 38 and connected to annular groove 122 by axial passage 136 and one or more of radial ports 138. One of the advantages of the present lubricating system for the hub and shaft over the standard design which normally has a series of annular grooves in the hub, is that in the present design the surfaces of the hub which contact the key are uninterrupted and straight, and hence do not cause nicks in the key which prevent the bushing from sliding freely on the shaft relative to the key. This, coupled with the effective distribution of the lubricant throughout the entire bearing surface, results in a long, uninterrupted operation, with the sheave requiring only infrequent servicing.

While a different hub structure is shown with respect to sheave 32, the hub structure 100 can be used advantageously in place of the standard bushing shown in connection with sheave 32. The structure would be essentially the same as that previously described, except that the hub would be modified to operate with spring 62 and to be lubricated through internal passages in the shaft 54, with the lubricant being supplied through fixture 144 on the outer end of shaft 54.

In the use and operation of the variable speed V-belt sheave with the improved hub installed therein, the hub is lubricated by injecting lubricant through fixture 134, passage 136, port or ports 138 and annular groove 122 into axial grooves 120. When the motor is running, the power output therefrom drives sheave 30, which in turn drives belt 80, sheave 32, and gear reducer 14. Shaft 22 connects the gear reducer to the equipment to be driven by the variable speed drive. If the speed of the output shaft is to be changed, for example to a faster speed, crank 92 is rotated to cause cam 93 to move lever 94 inwardly toward the sheave. This causes flange 36 to move toward flange 34, thereby causing belt 80 to move radially outwardly, and as it moves radially outwardly, the tension placed on the belt forces the belt on sheave 32 inwardly. This causes flange 60 to move to the right as seen in FIG. 1, against spring 62, thereby increasing the relative speed between sheaves 30 and 32. As this increase in speed occurs between the two sheaves, the rotational speed of shaft 22 likewise increases.

As flange 36 moves axially relative to flange 34, the hub 100 moves axially on shaft 38 and is effectively lubricated by the lubrication disposed in the spaced grooves 120, the lubrication being effectively distributed between the various grooves by ports 138 and annular groove 122. Since a straight and uninterrupted surface exists between the side of the key and the sides of key-way 112, the hub moves freely along the key. In the embodiment illustrated, the sheave containing this hub 100 must be occasionally lubricated; however, the effectiveness of the lubrication is enhanced by the full distribution of the lubrication over the external surface of the shaft and the internal surface of the hub, thus reducing fretting and scoring which would otherwise require frequent lubrication and/or replacement of the hub, and possibly the shaft, in order to maintain optimum performance.

While only one embodiment of the present variable speed V-belt drive has been described in detail herein, various changes and modifications may be made without departing from the scope of the invention.

I claim:

1. A variable speed V-belt sheave, comprising a rotatable shaft with an axial bore, a radial hole connected to said bore, and an annular groove in the surface of said shaft communicating with said hole, a pair of flanges, a hub with an internal wall defining a bore therethrough for one of said flanges mounted on said shaft and slidable axially thereon, complementary key-ways disposed axially in said shaft and hub, a key disposed in said key-ways for interlocking said shaft and hub against relative rotation therebetween while permitting axial movement therebetween, means defining a plurality of spaced, axially disposed lubrication grooves in the internal wall of said hub communicating with said annular groove, and means defining an annular lubrication groove in said internal wall of the hub near one end thereof interconnecting said axially disposed grooves for relieving excess lubricant in said axially disposed grooves.

2. A variable speed V-belt sheave as defined in claim 1 in which said hub supports a flange on one end, an annular groove is provided in the internal wall of said hub near the end adjacent said flange, and an annular seal is disposed in said annular groove.

3. A variable speed V-belt sheave as defined in claim 1 in which said hub supports a flange on one end near the end adjacent said flange, an annular groove is provided in the internal wall of said hub at each end thereof, and an annular seal is disposed in each of said annular grooves.

4. A variable speed V-belt sheave as defined in claim 1 in which the longitudinal surface of the key-way in said hub adjacent the key is smooth and substantially uninterrupted from said lubrication groove to the opposite end of said hub.

5. A variable speed V-belt sheave as defined in claim 3 in which the longitudinal surface of the key-way in said hub adjacent the key is smooth and substantially uninterrupted from said lubrication groove to the opposite end of said hub.

6. In a variable speed V-belt sheave having a shaft with lubrication passages therein, two flanges adjustable axially relative to one another on said shaft, and an axially disposed key-way in said shaft: a hub with an internal wall defining a bore therethrough for one of said flanges moveable only axially on said shaft, an axially disposed key-way complementary to the key-way in said shaft for receiving a key to restrain the relative rotation between the hub and shaft, means defining a plurality of spaced, axially disposed lubrication grooves in the internal wall of said hub for receiving lubrication from said passages and distributing the lubrication along said shaft, means defining an annular lubrication groove in said internal wall near one end thereof interconnecting said axially disposed grooves, and a port connected to said annular lubricating groove for flow of excess lubricant from said groove.

7. A variable speed V-belt sheave as defined in claim 6 in which said hub supports a flange on one end near the end adjacent the other of said flanges, an annular groove is provided in the internal wall of said hub, and an annular seal is disposed in said annular groove.

8. A variable speed V-belt sheave as defined in claim 6 in which the longitudinal surface of the key-way is smooth and substantially uninterrupted.

9. A variable speed V-belt sheave as defined in claim 7 in which the longitudinal surface of the key-way in said hub is smooth and uninterrupted from said lubrication groove to the opposite end of said hub.

* * * * *